United States Patent Office 3,825,483
Patented July 23, 1974

3,825,483
RED-OX POTENTIOMETER PROVIDED WITH A pH CORRECTION CIRCUIT
Toshihiko Nakamura, Yokohama, Japan, assignor to Nihon Filter Co., Ltd., Tokyo, Japan
Filed Nov. 6, 1972, Ser. No. 303,788
Int. Cl. G01n 27/46
U.S. Cl. 204—195 R                           2 Claims

ABSTRACT OF THE DISCLOSURE

A red-ox potentiometer which comprises a pH detecting part having a pH measuring electrode and a reference electrode, and a pH correction circuit having circuit constants selected according to the red-ox potential characteristics of a metallic ion containing solution to be tested, in addition to a red-ox potential detecting part having a red-ox electrode and a reference electrode, the red-ox potential and the pH electromotive force of the solution tested are detected respectively by said red-ox detecting part and pH detecting part, the output voltage from said pH detecting part is combined in said pH correction circuit with the output voltage from said red-ox detecting part to compensate the variations of red-ox potential caused by the variations of pH value of the solution, thereby a resultant voltage which represent always the red-ox potential corresponding to a predetermined pH value of the solution regardless of the variations of pH value of the solution is delivered from the output terminals of the pH correction circuit as a corrected output voltage of said circuit, and said corrected voltage is utilized for indicating the red-ox potential corresponding to said predetermined pH value of the solution or controlling the red-ox degree of the solution.

---

This invention relates an improved red-ox potentiometer used for determining the degree of reduction or oxidation, or the equivalence point of a solution by the measurement of the red-ox potential of said solution.

More particularly, this invention relates to a red-ox potentiometer (hereinafter referred to ORP meter) which is possible to determine exactly the degree of reduction or oxidation, or the equivalence point of a solution to be tested corresponds to a given pH value of said solution, regardless of the variations of actual pH value, by measuring the red-ox potential (hereinafter referred to ORP) of the solution tested and compensating the variations of ORP caused by the variation of pH value of said solutions.

It is possible, by the use of a ORP meter of this invention, to prevent the measurement error is introduced in the measured value of the ORP corresponding to a given pH value of a solution tested as the result of the change of the pH value from said given value.

The conventional ORP meters have merely functions of amplifying and indicating the electromotive force or potential difference generated between a red-ox electrode made of a noble metal and a reference electrode disposed in the ORP detecting part thereof dipped into a solution to be tested. However, the ORP of a solution changes with the change of pH value of the solution. That is, when the pH value of a solution is changed, the ORP of the solution will change even if the degree of reduction or oxidation or the equivalence point of the solution is kept unchanged, and generally the ORP corresponding to the same degree of reduction or oxidation or the equivalence point of the solution decreases with the increase of the pH value of the solution. Therefore, in case of measuring the degree of reduction or oxidation (hereinafter referred to red-ox degree) of a solution by means of a conventional ORP meter, it is necessary to use either the method in which the ORP is measured by the ORP meter while adjusting the pH value of the solution to a given value by utilizing a pH meter separately dipped into the solution and the red-ox degree of the solution having said given pH value is determined from the measured ORP, or the method wherein the ORP and pH value of the solution is simultaneously measured respectively by the ORP meter and a pH meter separately dipped into the solution and the red-ox degree of the solution is determined from said measured ORP and pH value by the use of a diagram of ORP characteristic curves previously plotted on the basis of the measurement for the same solution of various pH value. Thus, it is very difficult and is hardly possible in practice to determine continuously the red-ox degree of a solution which may vary its pH value from time to time by measuring the ORP of the solution.

It is an object of this invention to provide an improved ORP meter capable to determine at once the red-ox degree or the equivalence point of a solution to be tested from the measured ORP, regardless of the variations of pH value of the solution, by automatically correcting the variations of ORP caused by the variation of pH value of the solution.

It is another object to provide an improved ORP meter which comprises an ORP detecting part and a pH detecting part and is provided with a pH correction circuit, wherein the ORP and the pH electromotive force detected respectively by said ORP detecting part and pH detecting part are combined and a resultant voltage which indicate the ORP corresponding to a pre-set pH value of a solution tested is produced regardless of the variations of measured ORP caused by the variation of pH value of the solution.

According to the present invention, these objects can be attained by providing a ORP meter which is provided with a pH detecting part having a pH measuring electrode and a reference electrode, and a pH correction circuit having a circuit constants selected according to a pre-set pH value of a solution to be tested, in addition to a ORP detecting part having a red-ox electrode and a reference electrode, and the ORP and the pH electromotive force of the solution detected reespectively by the ORP detecting part and the pH detecting part are combined within said pH correction circuit so that the variations of the detected ORP caused by the variations of the pH value of the solution are compensated and a resultant voltage which indicating the corrected ORP corresponding to a pre-set pH value of the solution or the red-ox degree represented by said corrected ORP is produced.

Therefore, in the measurement of the red-ox degree or the equivalence point of a solution which varies its pH value with time, if a ORP meter of this invention is used, it is possible to measure very quickly and exactly the red-ox degree or the equivalence point corresponding to a pre-set pH value of the solution without any inconveniences or defects which are inevitable in case of using a conventional ORP meter as mentioned above.

Furthermore, the ORP meter of the invention comprises both of a ORP detecting part and a pH detecting part, therefore it is possible to use a common reference electrode and a common power supplying circuit for the ORP detecting part and pH detecting part, and the operation of measurement and the handling of measuring devices in the measurement using a ORP meter of this invention are very simple and easier, compared with the measurement wherein a conventional ORP meter and a separate pH meter are used, and the ORP is detected while adjusting the pH value of the solution to a pre-set value, or the ORP and pH value of the solution are measured simultaneously and the red-ox degree is determined by using ORP characteristic curves of said solution.

The construction of the ORP meter of this invention, and other objects and advantages of this invention will be apparent from the following description explaining in detail preferred embodiments of this invention with reference to the accompanying drawings, in which.

Figure 1:
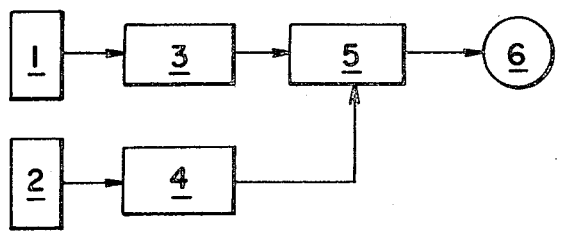
FIG. 1 is a block connection diagram of a ORP meter of this invention.

FIG. 1 is a block connection diagram showing the basic construction of a ORP meter of this invention. The ORP meter comprises, as shown in this figure, a ORP detecting part 1 having a red-ox electrode and a reference electrode, a pH detecting part 2 having a pH measuring electrode and a reference electrode, a ORP amplifier 3, a pH amplifier 4, and a pH correction circuit 5. The ORP electromotive force is induced, depending on the red-ox degree of a solution to be tested, across the red-ox electrode and reference electrode of the ORP detecting part 1 dipped into the solution, and the output voltage derived from said ORP detecting part 1 is amplified by the ORP amplifier, then is supplied to the pH correction circuit 5. On the other hand, the pH electromotive force is induced, depending on the pH value of said solution, across the pH electrode and reference electrode of the pH detecting part 2 also dipped into the solution adjacent to the ORP detecting part 1, and the output voltage derived from the pH detecting part 2 is amplified by the pH amplifier 4, then is applied to the pH correction circuit 5. In the correction circuit 5, the input voltages, that is an amplified ORP electromotive force and an amplified pH electromotive force are combined so that a resultant voltage which is equal to the ORP induced due to the same red-ox degree of the solution as that of the solution being tested when the solution has a preset pH value or a predetermined constant pH value. The resultant voltage which indicating a corrected ORP is derived from the pH correction circuit 5 as the output voltage of said circuit, and is applied to an indicating device 6 to indicate the ORP corresponding to the pre-set pH value of the solution.

Figure 2:
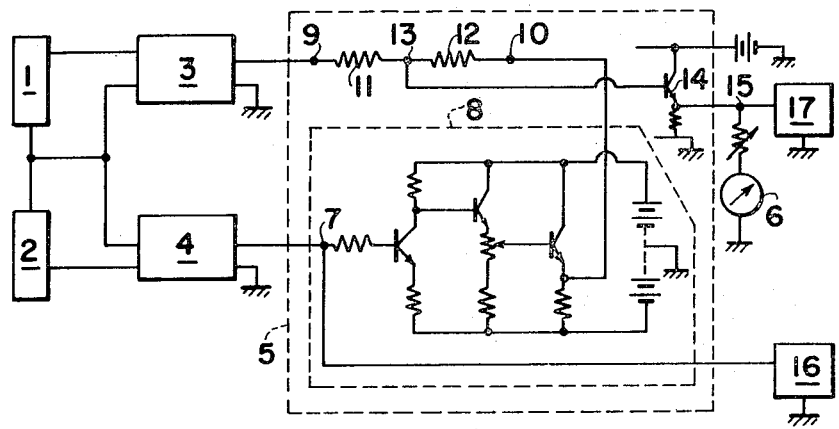
FIG. 2 is a circuit connection diagram of one embodiment of the ORP meter of this invention, shown partially in block.

FIG. 2 shows in detail an example of the pH correction circuit 5 of an ORP meter embodying this invention. In this embodiment, one common electrode is commonly used for the reference electrodes of the ORP detecting part 1 and the pH detecting part 2, and said both detecting parts are, therefore, electrically connected to each other.

Figure 3:
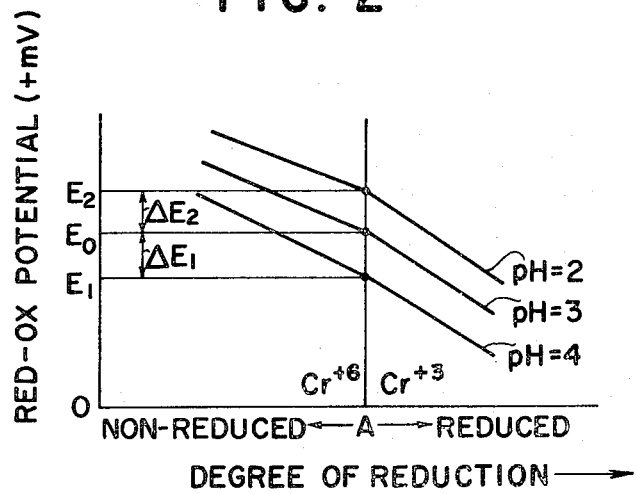
FIG. 3 is a diagram showing ORP characteristic curves of chromium ion containing solutions used for the explanation of the operations and effects of the ORP meter of this invention.

Explanation of the construction and functions of the pH correction circuit 5 shown in FIG. 2 is given with reference to the ORP characteristic curves for chromium ion containing solution shown in FIG. 3. The pH correction circuit 5 includes an inverting amplifier 8 having an input terminal 7 to which the output of pH amplifier 4 is applied, and resistors 11 and 12 connected in series between an input terminal 9 to which the output of the ORP amplifier 3 is applied and an output terminal 10 of the inverting amplifier 8.

The junction point 13 of said resistors 11 and 12 forms a terminal for delivering a resultant voltage obtained by superposing the amplified ORP electromotive force and amplified pH electromotive force. Said junction point 13 is connected, through an output amplifier 14 if desired, to an output terminal 15 of the pH correction circuit 5, and the output terminal 15 is connected to an indicating device 6. The inverting amplifier 8 and the output amplifier 14 may have any suitable well known circuit construction, therefore, detailed explanation of the circuit construction of these amplifiers is omitted.

In case of the measurement of the red-ox degree of, for example, chromium ion-containing solution having ORP characteristics shown in FIG. 3 by using an ORP meter of this invention shown in FIG. 2, circuit constants of the pH correction circuit 5 is selected, for example, in the following way.

First, suppose that amplification factors of the ORP amplifier 3, pH amplifier 4 and rolling amplifier 8 are A, B, and C, respectively, and that resistance values of the resistors 11 and 12 are $R_1$ and $R_2$, respectively. Here, assume $R_1$ is equal to $R_2$. If a resultant voltage $E_{R0}$ is generated at terminal 13 as a result of the ORP electromotive force $E_0$ detected by the ORP detecting part is compensated by the pH electromotive force $E_{pH3}$ detected by the pH detecting part 2 when the solution being tested has a pH value of pH=3 and a red-ox degree corresponds to the equivalence point A, then the circuit constants are selected to such values as the resultant voltage is always equal to $E_{R0}$, even if the pH value of the solution at equivalence point A changes from the value of pH=3 to any other value. In order to fulfill the requirement mentioned above, the following conditions must be met.

Assume that the pH value of the solution having a red-ox degree corresponding to the equivalence point A has changed to pH value of 4, for instance. Then, if a resultant voltage $E_{R1}$ is generated at terminal 13 as a result of the ORP electromotive force $E_1$ detected by the ORP detecting part 1 is compensated by the pH electromotive force $E_{pH4}$ detected by the pH detecting part 2, the relations $$E_{R0}=E_{R1}$$
$$E_{R0}-E_{R1}=0 \quad (1)$$

must be established.

$E_{R0}$ and $E_{R1}$ can be expressed by the following equations on the basis of the circuit construction shown by FIG. 2 and above-mentioned assumption.

$$E_{R0}=\frac{(E_{pH3}\times B)\times(-C)+E_0\times A}{2} \quad (2)$$

$$E_{R1}=\frac{(E_{pH4}\times B)\times(-C)+E_1\times A}{2} \quad (3)$$

Substitute equation (2) and (3) into equation (1), then it becomes the following equation.

$$E_{R0}-E_{R1}=\frac{(E_{pH3}\times B)\times(-C)+E_0\times A}{2}$$
$$-\frac{(E_{pH4}\times B)\times(-C)+E_1\times A}{2}$$
$$=\frac{(E_{pH3}-E_{pH4})\times B\times(-C)+(E_0-E_1)\times A}{2} \quad (4)$$

Now assuming $E_0=300$ mv., $E_1=250$ mv. $E_{pH3}=240$ mv. and $E_{pH4}=180$ mv. and substituting these values into equation (4), equation (5) is obtained.

$$E_{R0}-E_{R1}=\frac{(60\times B)\times(-C)+50\times A}{2} \quad (5)$$

If the circuit constants of $A=1$, $B=1$ and $-C=\frac{5}{6}$ are selected, the left side of equation (5) is equal to zero, and the condition of equation (1) is satisfied. Therefore, it is possible to accomplish the required correction of ORP through the pH correction circuit 5, and to indicate by the indicating device of the ORP corresponding to a pre-set pH value, regardless of the variation of pH value of the solution to be tested.

While in the above description, an example of the design of a pH correction circuit, or the selection of circuit constants thereof is explained with reference to the ORP characteristic curves for chromium ion containing solution, on the assumption that the ORP meter of this invention is used for a solution containing chromium ion, but is evident that an ORP meter provided with a pH correction circuit capable to measure the ORP corresponding to a pre-set pH value of a solution tested, regardless of any pH change of the solutions to be used for each of solutions containing respectively various can be obtained, by designing the pH correction circuit thereof with reference to ORP characteristic curves for the metallic ion containing solution to be tested. On the indicating device 6, a voltage reading scale may be marked for the ORP indication, or a scale indicating red-ox degrees presented by the ORP corresponding to a pre-set pH value may be marked along with or instead of said voltage reading scale for the direct indication of red-ox degree.

Furthermore, it is possible to connect, if desired, a pH alarming circuit or pH controlling circuit 16 to the input terminal of the inverting amplifier 8 of the ORP meter of this invention shown in FIG. 2, for alarming the change of pH value to a value beyond a pre-determined range or automatic controlling the pH value of the solution tested. It is also possible to connect an alarming circuit or a red-ox degree controlling circuit 17 to the output terminal of correction circuit 5, in parallel with or instead of the indicating device 6 for alarming the change of red-ox degree to a value beyond an predetermined range or automatic controlling the red-ox degree of a solution tested.

Although an ORP meter of this invention is described for a specific embodiment thereof, but this invention does not limited to these specific embodiment, and various modifications or changes are, of course, possible without departing from the scope or gist of this invention.

What I claim is:

1. A red-ox potentiometer provided with a pH correction circuit, characterized in that said red-ox potentiometer comprises a pH detecting part having a pH measuring electrode and a reference electrode, and a pH oorrection circuit, in addition to a red-ox potential detecting part having a red-ox electrode and a reference electrode, the output voltage from said pH detecting part is combined in said pH correction circuit with the output voltage of said red-ox potential detecting part to compensate the variations of the red-ox potential caused by the variations of pH value of a solution tested so that a corrected output voltage which represents the red-ox potential corresponding to a predetermined pH value of the solution tested is delivered from the output terminals of said pH correction circuit, and said corrected output voltage from said pH correction circuit is applied to an indicating device or a control circuit to actuate said device or circuit.

2. A red-ox potentiometer according to claim 1, said pH correction circuit has circuit constants selected according to said predetermined pH value of the solution tested, so that the resultant voltage obtained by combining the output voltage from said pH detecting part with the output voltage from said red-ox potential detecting part is always equal to the red-ox potential corresponding to the predetermined pH value of the solution tested regardless with the variations of pH value of the solution.

References Cited
UNITED STATES PATENTS

| | | | |
|---|---|---|---|
| 2,886,771 | 5/1959 | Vincent | 204—195 R |
| 2,949,765 | 8/1960 | Thayer et al. | 324—30 R |
| 3,663,409 | 5/1972 | Greene | 204—195 P |
| 3,431,508 | 3/1969 | Soltz et al. | 324—30 C |

TA-HSUNG TUNG, Primary Examiner

U.S. Cl. X.R.

204—1 T; 324—30 R